(12) United States Patent
Jones et al.

(10) Patent No.: US 9,561,391 B2
(45) Date of Patent: *Feb. 7, 2017

(54) VACUUM ANCHOR SYSTEM

(71) Applicant: Latchways plc, Devizes, Wiltshire (GB)

(72) Inventors: Owain Jones, Chippenham (GB); Karl Jones, Devizes (GB)

(73) Assignee: Latchways plc (GB)

( * ) Notice: Subject to any disclaimer, the term of this patent is extended or adjusted under 35 U.S.C. 154(b) by 0 days.

This patent is subject to a terminal disclaimer.

(21) Appl. No.: 14/738,612

(22) Filed: Jun. 12, 2015

(65) Prior Publication Data

US 2015/0335923 A1 Nov. 26, 2015

Related U.S. Application Data

(63) Continuation of application No. 13/643,067, filed as application No. PCT/GB2011/050837 on Apr. 27, 2011, now Pat. No. 9,056,211.

(30) Foreign Application Priority Data

Apr. 28, 2010 (GB) ..................................... 1007078

(51) Int. Cl.
| | | |
|---|---|---|
| *A45D 42/14* | (2006.01) | |
| *A62B 35/00* | (2006.01) | |
| *F16B 47/00* | (2006.01) | |
| *E04G 21/32* | (2006.01) | |
| *B64F 5/00* | (2006.01) | |

(52) U.S. Cl.
CPC ....... *A62B 35/0068* (2013.01); *E04G 21/3261* (2013.01); *E04G 21/3276* (2013.01); *F16B 47/00* (2013.01); *B64F 5/0081* (2013.01)

(58) Field of Classification Search
CPC ........... A47J 45/00; A62B 35/00; F16B 47/00; B64F 5/0081; E04G 21/3261
See application file for complete search history.

(56) References Cited

U.S. PATENT DOCUMENTS

| | | | | |
|---|---|---|---|---|
| 6,547,033 B1 * | 4/2003 | Cheval | ............... | A62B 35/0068 182/3 |
| 9,056,211 B2 * | 6/2015 | Jones | ................. | A62B 35/0068 |
| 2006/0273600 A1 * | 12/2006 | Rohlf | ................. | A62B 35/0068 248/683 |

* cited by examiner

*Primary Examiner* — Amy Sterling
(74) *Attorney, Agent, or Firm* — Tumey L.L.P.

(57) ABSTRACT

A vacuum anchor for securing a fall protection system to a surface has a gas inlet to receive pressurized gas from a gas container and generates a vacuum to secure the anchor to a surface. An attachment enables a fall protection system to be connected to the anchor, the attachment being rotatably mounted to the anchor. A container mounting device is provided for mounting the gas container to the anchor in connection with the gas inlet, the container mounting means being rotatable with the rotatable. Alternatively or additionally, the gas inlet is coaxial with the axis of rotation of the attachment means.

11 Claims, 3 Drawing Sheets

VACUUM ANCHOR SYSTEM

CROSS-REFERENCE TO RELATED APPLICATIONS

This application is a continuation of U.S. application Ser. No. 13/643,067 filed on Nov. 12, 2012, which is a U.S. national phase entry claiming priority to International Application Serial No. PCT/GB2011/050837 filed Apr. 27, 2011, and which claims priority to GB 1007078 filed Apr. 28, 2010, which are all herein incorporated by reference in their entirety.

BACKGROUND OF THE INVENTION

Field of the Invention

The present invention relates to a vacuum anchor system and particularly to such a system suitable for use in a fall protection system.

Technical Field

Fall protection systems, which include fall arrest or fall restraint systems, are used in order to provide safety to personnel working at height. For certain applications, such systems are known to employ vacuum anchor devices, particularly where required for temporary attachment to elevated metallic structures. Such systems can be used in fall arrest or restraint systems for use by personnel working on, for example, aircraft wings and fuselage; storage tanks; ships and the like. The vacuum anchor system is ideal for use in such circumstances because it does not require any permanent fixing structure (i.e. can be temporarily attached) and does not therefore damage the surface to which it is attached.

A remote vacuum source is typically utilised to supply a vacuum to the vacuum anchor. The vacuum source commonly utilises a pressurised gas supply connected to a venturi, which creates a suction force to draw the base against the surface to which it is mounted. The pressurised gas supply may be remote to the anchor, and may supply more than one anchor simultaneously. It is also known to provide the gas supply in the form of a pressurised gas bottle mounted on the anchor, which obviates the requirement for pipes connecting to a remote supply, which can provide a trip hazard when trailing along the work surface.

It is necessary for the worker connected to the anchor to be able to move freely on the elevated structure, and it is known to rotationally connect the lanyard to the anchor to enable this freedom of movement. However, as the worker moves about the anchor, it is possible that the lanyard may become tangled with the pressurised gas bottle, providing an inconvenience or worse still causing the bottle to disconnect from the anchor, potentially releasing the vacuum.

It is therefore desirable to provide an improved vacuum anchor which addresses the above described problems and/or which offers improvements generally.

According to the present invention there is provided a vacuum anchor as described in the accompanying claims.

BRIEF SUMMARY OF SOME OF THE PREFERRED EMBODIMENTS

In an embodiment of the invention there is provided a vacuum anchor for securing a fall protection system to a surface. The anchor comprises an anchor body having a gas inlet configured to receive pressurised gas from a gas container, and means for utilising the pressurised gas to generate a vacuum to secure the body to a surface; and attachment means for connecting a fall protection system to the anchor body, the attachment means being rotatably mounted to the anchor body. The vacuum anchor further comprises container mounting means for mounting a gas container to the anchor body in connection with the gas inlet, the container mounting means being arranged to be rotatable with the rotatable attachment means; and/or the gas inlet is coaxial with the axis of rotation of the attachment means.

By rotatably mounting the gas container to the anchor body in connection with the gas inlet such that it is rotatable with the attachment means, interference between the attachment means and the gas container during rotation is prevented. In addition, as the attachment means is rotated by the lanyard, the gas container rotates away from contact with the lanyard to prevent undesirable contact with the lanyard which may lead to accidental disconnection of the gas container.

Furthermore, by arranging the inlet such that it is coaxial with the rotational axis of the attachment means, a fixed gas inlet is able to be maintained while allowing the attachment means to rotate on the anchor body. The location of the gas inlet also ensures that a gas container mounted on the attachment means is always a constant distance from the gas inlet during rotation thereby preventing any stretching or pulling of interconnecting pipework. Alternatively, an external gas supply pipe may be vertically connected to the gas inlet. In this arrangement the attachment plate and the lanyard rotate about the inlet connection and hence the supply pipe thereby avoiding tangling.

The container mounting means may be directly connected to the attachment means such that rotation of the attachment means causes rotation of the container mounting means. The container mounting means may be provided on the attachment means.

The base of the anchor body may define a horizontal anchoring plane, and the rotational axis of the attachment means may be oriented substantially vertically relative to the anchoring plane.

The container mounting means may be configured to releasably mount the gas container to the anchor body.

The container mounting means may comprise a first mounting element configured for connection to a gas container, and a second mounting element connected to the attachment means, the first and second mounting elements being configured for releasable connection with each other.

The attachment means includes a lanyard connection point for connection to a lanyard of a fall protection system, and the container mounting means is connected to the attachment means on an opposing side of the rotational axis to the lanyard connection point.

The attachment means may include a lanyard connection point for connection to a lanyard of a fall protection system, and the container mounting means may be connected to the attachment means on the same side of the rotational axis as the lanyard connection point.

The container mounting means may comprise a locking projection element extending from one of the gas container and the attachment means, and a locking recess on the other of the gas container and the attachment means configured to lockingly receive the locking projection.

The gas inlet may be fixed to the anchor body, and the attachment means and container mounting may be arranged to rotate about the gas inlet relative to the gas inlet and the anchor body.

The gas inlet is configured to rotationally connect to an outlet of port of the gas container such that the outlet port is able to rotate relative to the gas inlet.

In another embodiment of the invention there is provided a vacuum anchor for securing a fall protection system to a surface. The anchor comprises an anchor body having a gas inlet configured to receive pressurised gas, and means for utilising the pressurised gas to generate a vacuum to secure the body to a surface; attachment means for connecting a fall protection system to the anchor body; container mounting means for mounting a pressurised gas container having a container outlet port to the anchor body. The gas inlet is configured for connection to the container outlet port, and the gas inlet and container mounting means are arranged such that the outlet port connects to the inlet when the container is connected to mounting means.

In this way, the gas container is able to be quickly and easily attached to and removed from the anchor body in a single attachment step. Attachment of further pipework or connections is not required. Furthermore, this arrangement ensures that a gas supply is initiated as soon as the gas container is connected to the anchor body.

The gas inlet may be directly connectable to the outlet port, thereby obviating the requirement for additional pipework.

The container outlet port may comprise an inlet connection portion for connection to the gas inlet of the anchor body, and an outlet connection portion for connection to the outlet of the gas container, the inlet connection portion being arranged such that when the outlet port is connected to the gas container, the inlet connection portion extends from the container in a direction substantially perpendicular to the longitudinal axis of the container.

The outlet port may comprise container attachment means for securing the outlet port to the gas container.

The outlet port may be integral with gas container.

BRIEF DESCRIPTION OF THE DRAWINGS

The present invention will now be described by way of example only with reference to the following illustrative figures in which.

DETAILED DESCRIPTION OF THE PREFERRED EMBODIMENTS

Figure 1:
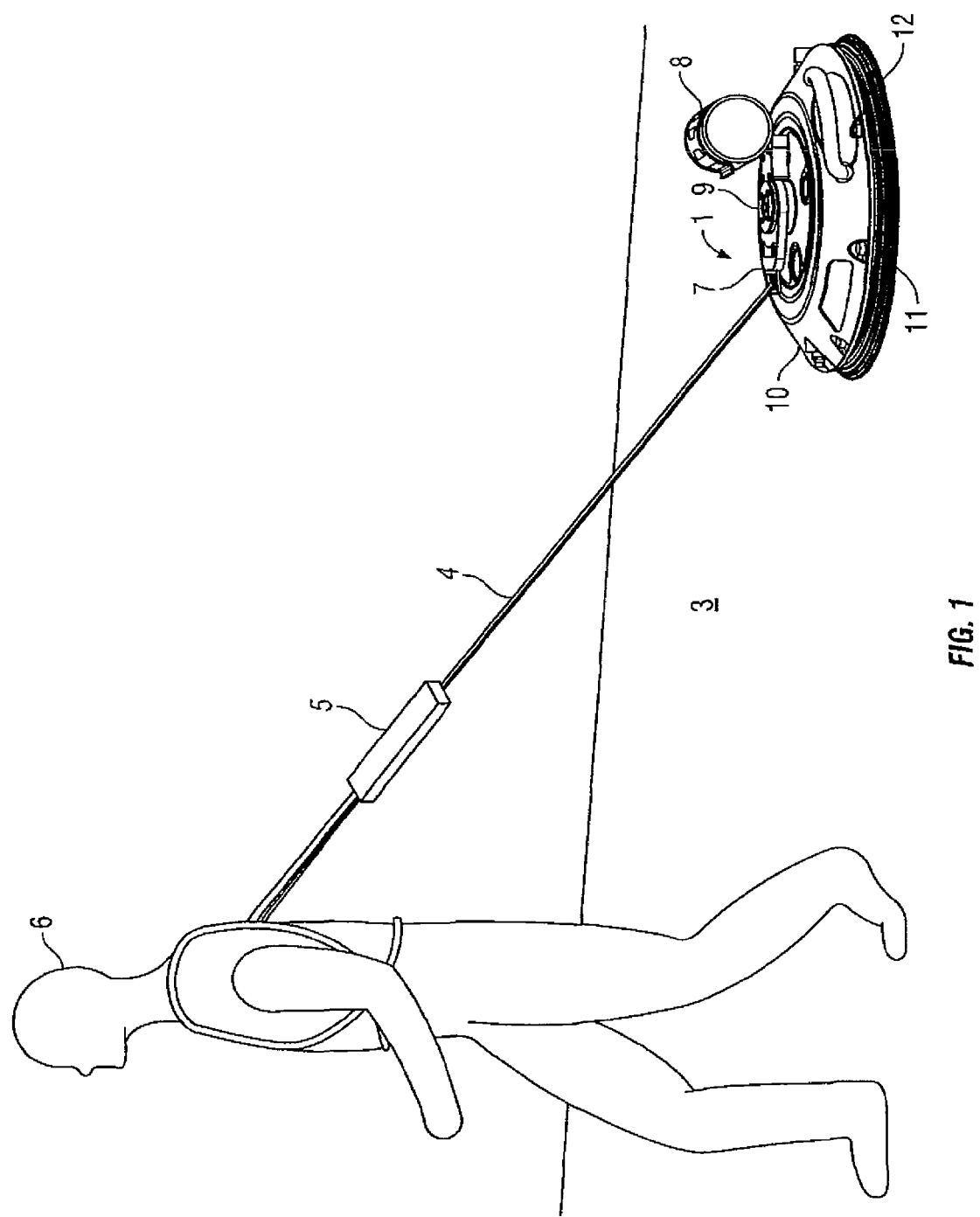
FIG. 1 is a diagrammatic representation of a vacuum anchor according to an embodiment of the invention connected to a worker via a fall protection system.

Referring to FIG. 1, a vacuum anchor 1 secures to a surface 3, which may for example be an aircraft wing, to provide a fixed anchor point to which a safety lanyard 4 of a fall protection system is connected. The lanyard 4 and associated shock pack 5 are connected to the anchor 1 and configured to arrest the fall of a person 6 to which they are connected. The lanyard 4 connects to a lanyard attachment point 7 on the anchor 1 by means of a karabina or similar lockable connection.

The anchor 1 includes a pressured gas container 8 which is connected by a gas supply pipe (not shown) to a gas inlet 9 provided on the substantially cylindrical anchor body 10. The pressurised gas from the gas container 8 is directed via the inlet 9 to a venturi housed within the anchor body 10. The venturi is in fluid connection with the base 11 of the anchor body 10, which is circumferentially surrounded at its periphery by a seal 12. Pressurised gas moving at high velocity through the venturi causes a pressure drop creating a vacuum at the base 11. The seal 12 surrounding the base 11 maintains the vacuum within the base 11, with the resulting suction drawing the base 11 against the surface 3 to anchor the body 10 against the surface 3.

A check valve may be provided within the anchor body 10, arranged to maintain the vacuum once it is created. A further release valve may also be provided to release the vacuum on demand. The venturi, gas pressure and anchor body size are selected to ensure that the vacuum suction generated is sufficient to withstand the impulse force generated by the arrest of a falling person by the fall protection system.

Figure 2A:
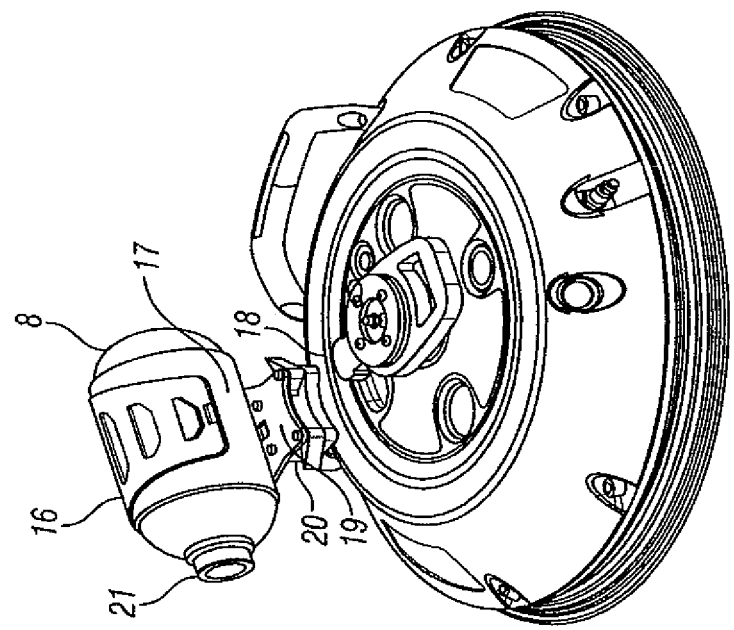
FIG. 2a shows the vacuum anchor of FIG. 1 with the gas container connected to the anchor body.
Figure 2B:
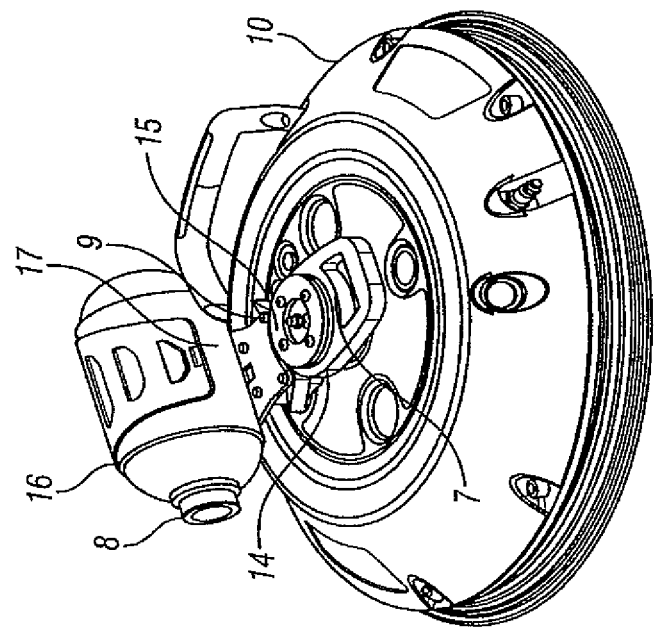
FIG. 2b shows the vacuum anchor of FIG. 1 with the gas container disconnected from the anchor body.

As shown in FIG. 2a, the lanyard attachment point 7 comprises an aperture formed within an attachment plate 14 configured to receive a lanyard connector. The attachment plate 14 is rotationally mounted to the anchor body 10 about a rotational axis 15.

The gas container 8 is releasably held within a container clamp 16, and may be removed therefrom to allow the canister to be replaced, or for the pressurised gas supply to be replenished. The container clamp 16 is connected to a mounting bracket 17 which mounts the gas container 8 to the attachment plate 14 on the opposing side of the rotational axis to the lanyard connection point 7. When connected to the attachment plate 14, as shown in FIG. 2a, the gas container 8 is rotatable with the attachment plate 14, about the axis of rotation 15.

The attachment plate 14 includes a connection lug 18 which extends horizontally away from the rotational axis 15 of the opposing side of the rotational axis 15 from the lanyard connection 7. The container mounting bracket 17 includes a connection recess 19 configured to lockingly receive the connection lug 18. The connection recess 19 includes wing connectors 20 which pivot on insertion of the lug 18, and engage with corresponding recesses inside of the lug 18, and which may be compressed to release the gas container 8.

A connection pipe (not shown) is connected to the outlet 21 of the gas container 8, and extends and connects to the gas inlet 9 of the anchor body 10. The gas inlet 9 is rigidly connected to the anchor body 10 such that the two are rotationally fixed relative to each other. A bearing is provided about the gas inlet 9 on which the attachment plate 14 is rotationally mounted.

The gas connector pipe and gas inlet 9 are configured for relative rotation, while maintaining a gas tight seal therebetween. In use, as the worker 6 connected to the anchor body manoeuvres about the surface 3, the lanyard 4 pulls on the attachment plate 14 at the inlet connection point 7 causing rotation of the attachment plate 14 and the gas container 8 about the rotational axis 15. As the gas connector and the gas inlet 9 are configured for relative rotation, when the gas container 8 rotates about the gas inlet 9 the gas connector rotates relative to the gas inlet 9 to enable continued free rotation of the gas container 8 and which prevents tangling or pulling of the gas connector.

Figure 3:
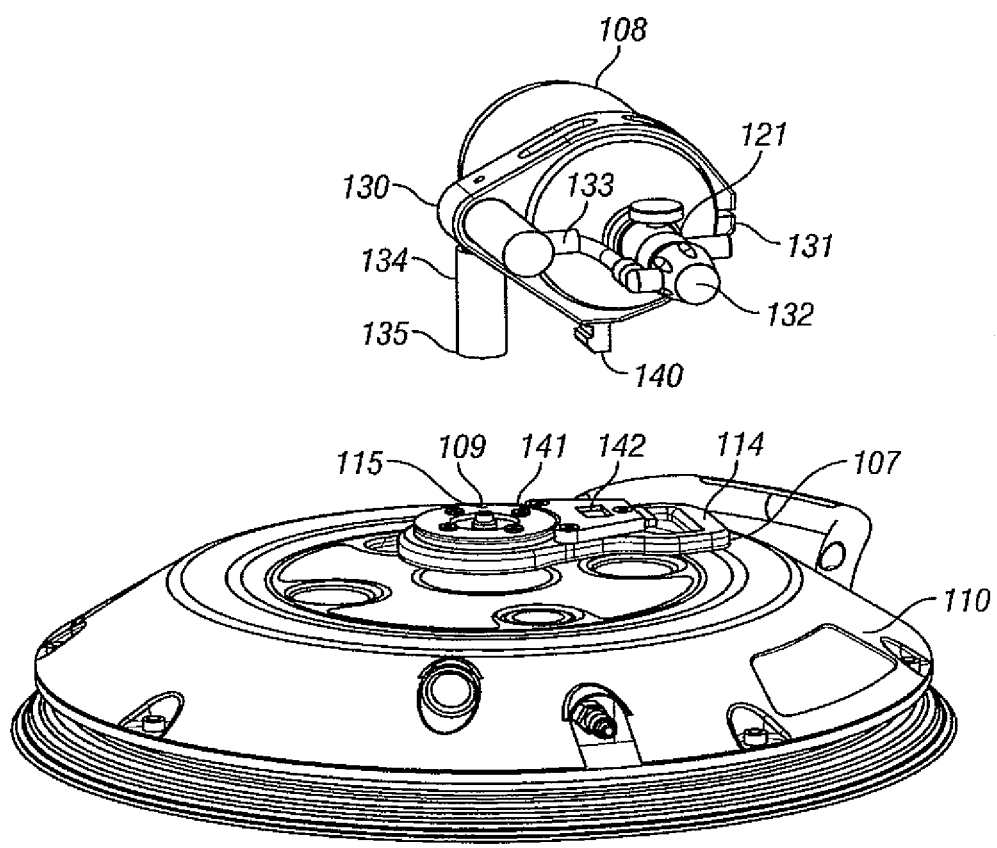
FIG. 3 shows a vacuum anchor according to an alternative embodiment invention.

In a further embodiment of the invention as shown in FIG. 3, the gas container 108 is provided with an outlet port arrangement 130. The outlet port arrangement 130 includes a clamp section 131 which secures to the outer surface of the gas container 108. An outlet valve connector 132 connects to the outlet 121 of the gas container 108 and directs gas via the supply tube 133 to the outlet port 134. The distal end of the outlet port 134 is configured for connection with the gas inlet 109 of the anchor body 110. The distal connection 135 between the outlet port 134 and the gas inlet 109 is configured as a push-fit arrangement, such that when pushed onto the gas inlet 109 the outlet port 134 forms a gas tight and rotatable connection with the gas inlet 109.

The gas container 108 further includes a connection lug 140 which projects downwards from the clamp member 131. A mounting plate 141 is fixed to the upper surface of the attachment plate 114, which is rotationally mounted about the gas inlet 109 as described in the previous embodiment. The mounting plate 141 includes a locking aperture 142 configured to receive the connection lug 140 to removably lock the gas container to the anchor body 110. The lateral spacing between the distal end of the outlet port 134 and the connection lug 140 is equal to the lateral distance between the gas inlet 109 and the locking aperture 142. In addition, the length of the outlet port 134 and the connection lug 140 are selected such that when the connection lug 140 is inserted into the connection aperture 142, the distal connector 135 of the outlet port 134 simultaneously connects with the gas inlet 109.

Furthermore, when the connection lug 140 is removed from the locking aperture 142 by depression of a release button or similar, and the gas container 108 is pulled upwardly, the lug 140 and outlet port 134 are simultaneously disconnected from the locking aperture 142 and gas inlet 109 respectively. As such, the gas container 108 may be quickly and easily rotatably connected to the anchor body 110, and similarly may be quickly and easily removed.

The gas outlet 134 is preferably a rigid cylindrical member arranged to extend downwardly from the gas container 108 in a direction perpendicular to the longitudinal axis of the gas container 108. As such, the rigid nature of the outlet port 134 enables the gas container 108 to be at least partially supported on the anchor body 110 by the outlet port 134. Furthermore, as the outlet port 134 extends perpendicularly to the longitudinal axis of the gas container 108, the gas container 108 may be arranged horizontally relative to the upper surface of the anchor body 110 to limit its vertical profile, as opposed for example to extending vertically upwards, which increases the risk of the container 108 being knocked or accidentally disconnected from the anchor body 110.

The mounting plate 142 is preferably connected to the attachment plate 114 on the same side of the rotational axis 115 as the lanyard connection point 107. As such, the weight of the container is distributed close to the lanyard connection point 107, to enable smoother rotation of the attachment plate about the rotational axis point 115.

It will be appreciated that in further embodiments various modifications to the specific arrangements described above and shown in the drawings may be made. For example, while the vacuum system is described as being provided by a venturi arrangement, such is not essential, and any means for creating a vacuum using a pressurised gas supply may be utilised. Furthermore, while the invention is described for use with an aircraft wing, this is not essential and the invention may be applied to any suitable surface with which a vacuum seal may be created.

What is claimed:

1. A vacuum anchor for securing a fall protection system to a surface, the anchor comprising:
    an anchor body having a gas inlet configured to receive pressurised gas from a gas container, and to generate a vacuum to secure the body to a surface; and
    attachment means for connecting a fall protection system to the anchor body, the attachment means being rotatably mounted to the anchor body;
    wherein:
    (i) the vacuum anchor further comprises container mounting means for mounting a gas container to the anchor body in connection with the gas inlet, the container mounting means being arranged to be rotatable with the rotatable attachment means;
    (ii) the gas inlet is fixed to the anchor body, and the attachment means and the container mounting are arranged to rotate about the gas inlet relative to the gas inlet and the anchor body.

2. The vacuum anchor of claim 1, wherein the container mounting means is connected to the attachment means such that rotation of the attachment means causes rotation of the container mounting means.

3. The vacuum anchor of claim 1, wherein the container mounting means is a clamp section.

4. The vacuum anchor of claim 1, wherein the anchor body comprise a base, and wherein the base defines a horizontal anchoring plane, and the rotational axis of the attachment means is oriented substantially vertically relative to the anchoring plane.

5. The vacuum anchor of claim 1, wherein the gas container further includes a connection lug, and wherein the connection lug projects downwards.

6. The vacuum anchor of claim 1, wherein a mounting plate is fixed to an upper surface of the attachment means.

7. The vacuum anchor of claim 6, wherein the mounting plate further includes a locking aperture, wherein the locking aperture attaches to the gas container by a connection lug.

8. The vacuum anchor of claim 7, wherein the connection lug is removed from the locking aperture by depressing a release button on the gas container.

9. The vacuum anchor of claim 7, wherein lateral spacing between a distal end of the outlet port and the connection lug is equal to a lateral distance between the gas inlet and the locking aperture.

10. The vacuum anchor of claim 1, wherein the outlet port extends perpendicularly to the longitudinal axis of the gas container.

11. The vacuum anchor of claim 10, wherein the gas container is arranged horizontally to an upper surface of the anchor body.

* * * * *